Figure 1:
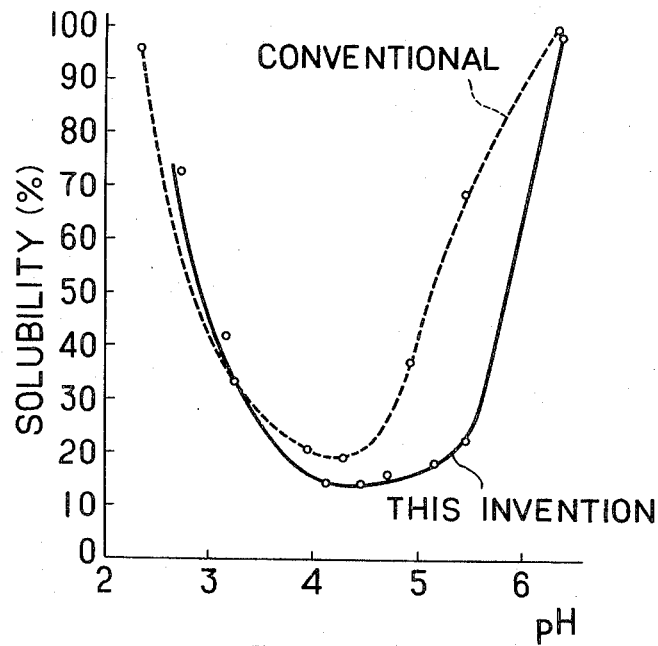
Figure 2:
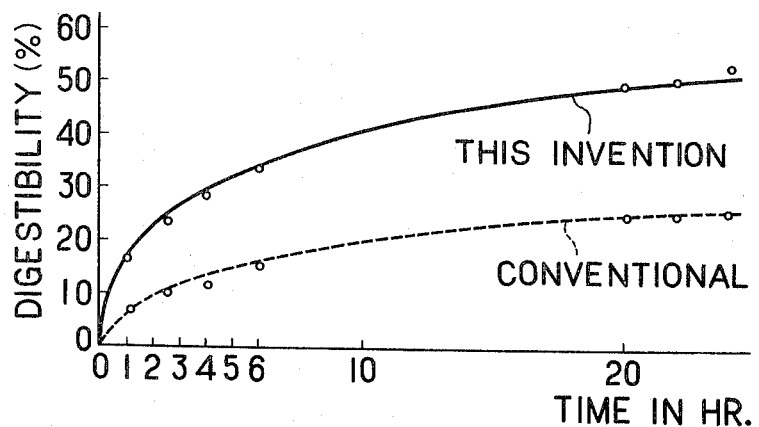

3,303,182
DENATURED SOYBEAN PROTEIN AND METHODS OF MAKING THE SAME BY TREATING AT TEMPERATURES BELOW 5° C.

Hiroshi Sakai, Fujisawa-shi, Kanagawa-ken, Haruki Hara, Musashino-shi, Tokyo, and Akihiko Akioka, Setagava-ku, Tokyo, Japan, assignors to The Nisshin Oil Mills, Ltd., Tokyo, Japan, a corporation of Japan
Filed Mar. 23, 1964, Ser. No. 354,010
10 Claims. (Cl. 260—123.5)

This invention relates to the production of denatured protein from soybean materials. Especially, it relates to the production of such denatured soybean protein suitable for food uses, sterilized, enzyme-inactivated, and readily soluble in water at a neutral pH.

According to the present invention, 100 parts of the soybean meal containing large amounts of soluble protein are treated with more than 800 parts of water, and water dispersible components are then extracted. The resultant protein dispersion is heated at over 80° C. for from a few seconds to 60 minutes, in order to denature the protein and sterilize or inactivate deleterious bacteria and enzymes.

The heat treated dispersion is rapidly cooled to under 5° C., then adjusted to a pH of between 5 and 4.2 by adding acid in order to precipitate the protein material, which is recovered and dried by the usual methods.

Usually, in isolating soybean protein from soybean, soluble protein component has been extracted by water or dilute alkaline solution from defatted soybean meal. After removing insoluble matter by centrifuge or filter, protein is precipitated from solution by adjusting its pH. Then, protein precipitate is washed and dried as it is, or after adjusting its pH to neutral. The protein product thus recovered is not denatured and the digestibility of the protein is rather lower; also it is contaminated with bacteria and enzymes.

According to the present invention, however, the protein product is so denatured that it is changed in the configuration of the protein molecule, and it has different properties from untreated protein in colloidal behavior such as viscosity of dispersion, solubility for pH change and digestibility. Also, the protein product is satisfactorily sterilized.

When the protein dispersion extracted from defatted soybean meal which has a maximum solid content of 10%, is heated at a temperature over 80° C. for a predetermined time, the protein is fully denatured, increased in digestibility and yet maintains its solubility. Moreover, deleterious bacteria and enzymes in defatted meal are satisfactorily sterilized or inactivated. In this denaturing process, the time required to heat is determined by the treating temperature; for example at treating temperatures from 80° to 90° C., it takes from 30 minutes to 1 hr. but at 135° C., only from a few seconds to few minutes. And under these conditions discoloration and insolubilizing of protein is slight. When protein dispersion having more than 10% of solid content is heated, the protein is insolubilized or gelled, and the resultant denatured protein has a reduced solubility. Therefore, the solid content of the protein dispersion has to be less than 10%, and it needs water more than 8 times by weight of the soybean meal.

The heated dispersion is then cooled to under 5° C. as rapidly as possible and is precipitated at its isoelectric point, at a pH of about 4.5. However, if the denatured protein is precipitated at over 5° C., the resultant precipitate can not fully recover its neutral dispersibility or solubility. According to this invention, by isoelectric precipitation at under 5° C. re-dispersibility of protein at neutral pH remains nearly 100%.

FIG. 1 is graphical representation of the relation between pH of protein dispersion and solubility of protein by this invention and conventional process. That is, the denatured protein according to this invention has its solubility reduced rapidly at a pH of from 6.5 to 5.5, but conventional protein has its solubility reduced more gradually. Although the solubility of the denatured protein of this invention changes slightly at the minimum solubility point and its neighborhood, between a pH of 5.0 and 4.0, conventional protein has a sharp minimum point at pH of 4.2. And, solubility of the denatured protein at its isoelectric point near the pH of 4.2 is lower than that of conventional protein; therefore according to this invention we can obtain better recovery yield of protein even at so higher a pH range than by the conventional method, that it needs only a relatively small amount of acid to precipitate the denatured protein.

Relation between precipitating temperature and protein re-solubility is shown in the following table. In these tests, the heat-denatured protein dispersion by the process of this invention is isoelectric precipitated at various temperatures, and the untreated protein dispersion at 30° C. and 80° C. Each protein precipitate is recovered and washed, and adjusted to a pH of 6.5 by adding alkali in order to re-disperse the protein.

| Treatment | Precipitating temp., °C. | Protein re-solubility, percent |
|---|---|---|
| Heat denatured | 3 | 100 |
| Do | 10 | 87 |
| Do | 30 | 73 |
| Untreated | 80 | 18 |
| Do | 30 | 100 |

FIG. II shows the difference in digestibility (in vitro) between the proteins prepared by processes of this invention and conventional process.

As described above, by this invention, the protein product is good in digestibility, satisfactorily sterilized, enzyme-inactivated and suitable for food uses.

Specific examples of the process are as follows:

Example I

Five kilo-grams of soybean high soluble protein meal (moisture: 7.5%, crude protein: 51% and N.S.I.: 90) which have been defatted with n-hexane and desolventized by superheated solvent vapor, were charged into a tank and 10 g. of sodium hydrogen sulfite and 50 liters of water were added. The mixture was stirred until in dispersion, heated at 90° C. for 15 minutes. Filtrate was separated by basket type centrifuge from insoluble residue, cooled rapidly to 5° C. by chilling brine under stirring; and 450 ml. of 10% hydrochloric acid was added to the filtrate until the pH was reached to about 4.5, the protein was precipitated, recovered by basket type centrifuge. Protein precipitate, after washing with fresh water, was completely re-dissolved in 5 liters of water with addition of 20 g. of sodium hydroxide to the pH of 6.4 and spray-dried to yield 1.3 kg. of dry powder (moisture: 7%, crude protein: 86%, soluble protein: 95% and enzyme-activity: negative). The growth efficiency of the denatured protein prepared as herein described is found the same as that of milk casein, when semipurified diets containing 15% protein were fed to male white rats of Wistar strain.

Example II

A mixture composed of 15 kg. of solvent-extracted soybean high soluble protein meal (moisture: 9%, crude protein: 50.2% and N.S.I.: 90), 150 liters of water and 20 g. of sodium hydrogen sulfite were agitated at 60° C. for 30 min. The protein was extracted, separated from residue by centrifuge, heated to 135° C., kept at that temperature for few seconds and then cooled to 3° C. rapidly by passing through a continuous sterilizer-cooler consisting of plate type heat exchanger and holding tube, precipitated by adjusting the pH to its isoelectric point, and recovered by vacuum drum filter. After washing with fresh water, the protein precipitate was re-dissolved in water at a neutral pH by adding potassium and ammonium hydroxides, spray-dried at 120° C. to obtain yellowish white powder containing moisture 7%, crude protein 87%, and soluble protein 99%.

*Example III*

This process was the same as in Example II but instead of plate type heat exchanger as continuous sterilizer, a continuous direct steam injection heating device was used to heat the protein dispersion to 135° C. and kept at that temperature for a few seconds, while it flowed through the pipe line.

*Example IV*

This process was the same as in Example II but instead of plate type heat exchanger as continuous cooler, vacuum flash chamber was used where the flashed liquid was cooled to about 70° C., and then further cooled to 3° C. by brine chiller. The following process was the same as examples described above.

*Example V*

All-vegetable frozen dessert (imitation ice cream) was prepared from the denatured soybean protein manufactured by the method of Example II.

Formula is shown as below:

| | Parts |
|---|---|
| Protein of Example II | 500 |
| Vegetable shortening oil, M.P. 30° C. | 300 |
| Dextrine, D.E. 25 | 700 |
| Refined glucose | 1,250 |
| Sugar | 250 |
| Sodium cyclohexyl sulfaminate | 5 |
| C.M.C. | 20 |
| Monoglyceride distilled | 30 |
| Water | 7,000 |
| Flavor, a little. | |
| Total | 10,055 |

After pasteurizing, the mix was homogenized at pressure 150 kg./cm.$^2$, aged over night at 8° C., frozen and hardened at −25° C.

Imitation ice cream thus prepared was good in taste, texture and flavor, and its over-run was 50%.

What we claim is:

1. A process for preparing denatured soybean protein suitable for food uses which comprises
 (a) a protein dispersion extracted from 100 parts of high soluble proteinaceous soybean meal with more than 800 parts of water is heated at a temperature of from 80° C. to 150° C. for from a few seconds to 60 minutes to denature said protein,
 (b) said denatured protein is cooled rapidly to below 5° C.,
 (c) said denatured protein is then precipitated at its isoelectric point and recovered and dried.

2. A process as claimed in claim 1, wherein the temperature of heat treatment for protein denaturation is between 120° C. and 150° C., and treating time is between a few seconds and 30 seconds.

3. A process as claimed in claim 1, wherein the heat treatment for protein denaturation is carried out in an autoclave at over 100° C.

4. A process as claimed in claim 3, wherein the time of heat treatment for protein denaturation is between 5 and 30 minutes.

5. A process as claimed in claim 1, wherein the heat treatment for protein denaturation is carried out in a conventional sterilizer used for dairy industry.

6. A process as claimed in claim 1, wherein the heat treatment for protein denaturation is carried out in an apparatus provided with heat exchanger and holding tube or tank.

7. A process as claimed in claim 1, wherein the heat treatment for protein denaturation is carried out in an apparatus provided with a direct steam injection heater or jet heater and holding tube or tank.

8. A process as claimed in claim 1, wherein cooling is carried out with an apparatus composed of vacuum flash chamber and conventional chiller or cooler.

9. A process as claimed in claim 7, wherein cooling is carried out with a vacuum flash chamber and a conventional chiller or cooler.

10. Denatured soybean protein suitable for food uses as prepared by the method of claim 1.

No references cited.

WILLIAM H. SHORT, *Primary Examiner.*

H. E. SCHAIN, *Assistant Examiner.*